(12) United States Patent
Donald et al.

(10) Patent No.: US 6,415,074 B1
(45) Date of Patent: Jul. 2, 2002

(54) DEVICES AND METHODS FOR OPTICAL COMMUNICATION SYSTEMS

(75) Inventors: David K. Donald, Sunnyvale; Kelvin Chau, Pleasanton; Kiet D. Ngo, San Mateo; Joseph A. Parker, Los Gatos, all of CA (US)

(73) Assignee: Opthos, San Carlos, CA (US)

( * ) Notice: Subject to any disclaimer, the term of this patent is extended or adjusted under 35 U.S.C. 154(b) by 8 days.

(21) Appl. No.: 09/727,528

(22) Filed: Nov. 28, 2000

Related U.S. Application Data (63) Continuation-in-part of application No. 09/706,229, filed on Nov. 3, 2000.
(60) Provisional application No. 60/231,056, filed on Sep. 8, 2000, and provisional application No. 60/235,235, filed on Sep. 25, 2000.

(51) Int. Cl.[7] .................................................. G02B 6/28
(52) U.S. Cl. ............................. 385/24; 359/124; 385/37
(58) Field of Search ............................. 385/24, 14, 37; 359/124, 127, 115, 119, 118, 154, 157

(56) References Cited

U.S. PATENT DOCUMENTS 6,173,093 B1 * 1/2001 Jeal .............................. 385/24

OTHER PUBLICATIONS

MONET Consortium Public–MONET Program; "Multi-wavelength Optical Networking (MONET) Technology", Jul. 1998, May 1999, http://bell–labs.com/project/MONET/mon_pro.html.

MONET Consortium Public WWW page, "Multiwavelength Optical NETworking", http://www.bell–labs.com/project/MONET/MONET field Experiment Configuration.

Johnson, S.R. et al., "Advanced Optical Networking—Lucents MONET Network Elements", BELL LABS TECHNICAL JOURNAL, Jan.–Mar., 1999, pp. 145–169.

* cited by examiner

Primary Examiner—Hemang Sanghavi
Assistant Examiner—Scott Knauss
(74) Attorney, Agent, or Firm—Paul Davis; Wilson Sonsini Goodrich & Rosati (57) ABSTRACT

An optical assembly having a light circulating device is used for routing light and may be used with a receiver. The assembly includes a tunable filter for receiving light traveling from the light circulating device and for selecting which wavelengths of light that reach the receiver. A wavelength routing mechanism optically coupled to the tunable filter and located downstream from the circulator is used to prevent undesired dropping of signal wavelengths. The mechanism has a first operational mode preventing light from reaching the receiver and a second operational mode allowing light to reach the receiver. When the filter is tuning, the mechanism is preferably in the first operational mode. Preferably, the assembly has an arrangement of mirror reflections on the first path and the second path so that an even number of mirror reflection are experienced on one path and an odd number on the other path as light is recombined.

18 Claims, 10 Drawing Sheets

DEVICES AND METHODS FOR OPTICAL COMMUNICATION SYSTEMS

CROSS-REFERENCE TO RELATED APPLICATIONS

The present application is a continuation-in-part of commonly assigned co-pending U.S. patent application Ser. No. 09/706,229, filed Nov. 3, 2000. The present application is related to U.S. Provisional Patent Application Ser. No. 60/231,056, filed Sep. 8, 2000 and U.S. Provisional Patent Application Ser. No. 60/235,235, filed Sep. 25, 2000. The present application is also related to commonly assigned co-pending U.S. patent application Ser. No. 09/706,231, filed Nov. 3, 2000, U.S. patent application Ser. No. 09/706,230, filed Nov. 3, 2000, U.S. patent application Ser. No. 09/715,841, filed Nov. 17, 2000 and U.S. patent application Ser. No. 09/716,172, filed Nov. 17, 2000. The complete disclosure of all applications listed above are incorporated herein by reference for all purposes.

BACKGROUND OF THE INVENTION

1. Field of the Invention

This invention relates to optical networks, and more particularly, to optical wavelength routing mechanisms.

2. Description of Related Art

In telecommunications, optical fiber has become one of the most successful transmission media due to its high transmission rates and low error rates. Driven by subscriber demand, network owners are currently deploying systems capable of supporting fiber for business and residential applications.

In known systems, the synchronous optical network (SONET) standard defines the physical interface and optical line rates known as optical carriers (OC) signals, a frame format and an OA&M protocol. User signals are converted into a standard electrical format called the synchronous transport signal (STS), which is the equivalent to the format of the optical signal (OC).

As the bandwidth and infrastructure needs increase, fiber exhaust is becoming rapidly growing problem. A solution to fiber exhaust is to use a plurality of channels on the same fiber, the channels being routed separately according to their wavelength, a technique termed wavelength division multiplexing (WDM).

WDM transmission can provide manifold capacity expansion on existing fiber links. Its potential for routing signals is equally important. By introducing WDM, the capacity of a ring can be increased in an efficient and cost-effective way with a 100% multiplex section protection, and with minimal changes to the nodes hardware or to the automatic switching protocol (ASP).

Single and multihop WDM network architectures have been studied. See, for example, "Dense Wavelength Division Multiplexing Networks" by C. A Brackett, IEEE Journal on Selected Areas in Communications, Vol. 8, No. 6, 1990, pp. 948–964; and "Terabit Lightwave Networks: Multihop Approach" by A. S. Acampora et al., AT&T Technical Journal, November–December 1987, pp. 21–34.

Further discussions on local area networks are found in the following, "Dense Wavelength Division Multiplexing Networks", C. A. Brackett, IEEE Journal on Selected Areas in Communications, vol. 8, No. 6, 1990, pp. 948–964, "Terabit Lightwave Networks: Multihop Approach", A. S. Acampora et al., AT&T Technical Journal, November–December 1987, pp. 21–34, The Lambdanet Multiwavelength Network: Architecture, Applications and Demonstrations, M. Goodman et al., IEEE Journal on Selected Areas in Communications, vol. 8, No. 6, 1990, pp. 995–1004 and "Performance Analysis of Multihop Lightwave Networks with Hot Potato Routing and Distance-Age Priorities", Z. Zhang et al., IEEE Transactions on Communications, vol. 42, No. 8, August 1994, pp. 2571–2581.

A typical network architecture in the metro area can be subdivided into both an access and a core network, each with a unique set of characteristics. The core portion of current metropolitan networks face serious challenges adapting to the emergence of high bandwidth IP services. Current core deployments are based almost exclusively on SONET ring architectures, most often BLSR's. In the past, these rings have provided a cost-effective means to transport core traffic which is mainly central office (CO) to CO circuit-switched demand.

While these networks can efficiently manipulate low-bandwidths voice-oriented traffic, they become significantly less effective when faced with high-capacity IP services. Today, such demand is often routed over SONET rings simply to provide the protection switching speeds that have become an essential element of many service level agreements. In areas where fiber exhaust is a concern, a problem now emerging in the metropolitan environment, these multiple overlaid SONET rings can be aggregated over a single set of fibers through the use of dense wavelength division multiplexing (DWDM) systems. Since most of the systems commercially available today are configured as point-to-point DWDM terminals, they must be placed "back-to-back" for use in a SONET architecture. This complex configuration can result in considerable capital equipment outlay and the operational complications associated with multiple equipment layers.

At each node in the network, some wavelengths may be dropped or added into the data stream. In situations where video or other audio media are being "broadcast," there may be a need for drop-and-continue functionality of the nodes. This allows the nodes to drop data for users receiving the broadcast but also continuing that information on to other nodes where other users may also be tuned into the same broadcast.

Optical network designers have long desired to find simpler and cheaper equipment for performing add/drop function at each node. Particularly in WDM systems, designers have desired to use tunable filters to dynamically remove wavelengths or lambdas ($\lambda$'s) from incoming light stream. There are significant cost and design advantages to using tunable filters that can dynamically scan and drop lambdas across a wide spectrum of wavelengths.

Unfortunately, one limitation of using tunable filters in optical wavelength routing relates to the undesirable and inadvertent dropping of wavelengths and signal in a WDM or DWDM network when the tunable filter scans from wavelength to nonadjacent wavelength. This is data leakage. For example, scanning from wavelength 1 to say wavelength 5, the tunable filter would end up dropping each wavelength in between (2, 3, and 4) that the filter traverse to reach wavelength 5. From a quality of service perspective, the dropping of these wavelengths would not be acceptable as these other wavelengths in a multi-wavelength WDM system are also carrying data required by the current or other nodes. The dropping of wavelengths could cause data to be delayed or more likely lost while the tunable filter traverses its passband from its current wavelength to the desired wavelength to be dropped. Additionally, some known systems may be able to scan a few frequencies but they cannot typically scan the entire spectrum of signal wavelength without adding a significant number of parts at increased bulk and cost.

Accordingly, there is a need for improved equipment designs that address the dropped wavelength situation associated with tunable filters. The use of tunable filters could greatly reduce the number and types of switches and other parts used in equipment architecture for DWDM systems. A further need exists for tunable devices that traverse the majority of the wavelengths used in the data spectrum to provide dynamic optical wavelength drop/continue. It is further desired that the device be of sufficient speed so as to minimize any amount of data that may be lost or delayed during tuning.

SUMMARY OF THE INVENTION

The present invention provides devices and methods for improving optical network equipment architecture. More specifically, the present invention addresses the undesired data leakage or signal drop when tunable filters attempt to move their passband from one signal wavelength to a nonadjacent wavelength. Although not limited to the following, the present invention is of particular use with Fabry-Perot type tunable filters.

In one aspect of the present invention, an optical assembly having a light circulating device is used for routing light and may be used with a receiver. The assembly includes a tunable filter for receiving light traveling from the light circulating device and for selecting which wavelengths of light that reach the receiver. A wavelength routing mechanism optically coupled to the tunable filter and located downstream from the circulator is used to prevent undesired dropping of signal wavelengths. The mechanism has a first operational mode preventing light from reaching the receiver and a second operational mode allowing light to reach the receiver. When the filter is tuning, the mechanism is preferably in the first operational mode. The receiver may be a device that receives signals in the optical domain and converts them into the electrical domain.

In another aspect of the present invention, an optical assembly having a light circulating device and a tunable filter is used to deliver signals to a receiver. The tunable filter receives light traveling from the input of the light circulating device and has a passband that allows light at a first signal wavelength to pass while reflecting other signal wavelengths back to the light circulating device along a through path from the filter to the output of the light circulating device. A wavelength routing mechanism optically coupled to the tunable filter is adapted to direct light at wavelength (or wavelengths in some situations) of the passband along at least a portion of the through pathway back to the light circulating device. Preferably, the tunable filter has a normal operating mode and a tuning mode, whereby light only reaches the receiver when the tunable filter is in normal operating mode. More preferably, the assembly an arrangement of mirror reflections on the first path and the second path so that an even number of mirror reflection are experienced on one path and an odd number on the other path as light is recombined at the coupler.

In another aspect of the present invention, an optical assembly for for directing light and for use with a receiver comprises a light circulating device having at least an input and an output. A tunable filter receives light traveling from the light circulating device. The assembly further includes a wavelength routing mechanism optically coupled to the tunable filter. The mechanism has an operational mode preventing light from reaching the receiver by directing wavelengths passing through the tunable filter along a path extending outwardly from the wavelength routing mechanism towards a light combiner for joining light on the first path with light on a second path extending outwardly from the output of the light circulating device. The assembly preferably includes a polarization rotating device disposed along a first pathway for changing polarization of light on the first pathway prior to joining light from said second pathway at said coupler.

These and other embodiments of the present invention, as well as its advantages and features, are described in more detail in conjunction with the text below and attached figures.

DETAILED DESCRIPTION

The devices and methods of the present invention will significantly improve the performance and cost efficiency of equipment used in optical networking systems. These devices and methods are particularly well adapted for systems using a plurality of channels on the same fiber, the channels being routed separately according to their wavelength, a technique termed wavelength division multiplexing (WDM). The present invention is compatible with other multi-channel configurations, and it should be understood that the present invention is not limited to systems using WDM or DWDM wavelength spacings. The present invention provides substantial cost efficiencies by providing node equipment architecture or assemblies that reduce the number of parts required to scan a wide spectrum of wavelengths and can drop any one of them without creating undesired data loss. The present invention is of particular use with Fabry-Perot type tunable filters. As mentioned, the present invention further addresses the undesired data leakage or signal drop when tunable filters attempt to move its passband from its current wavelength to a nonadjacent wavelength.

Figure 1:
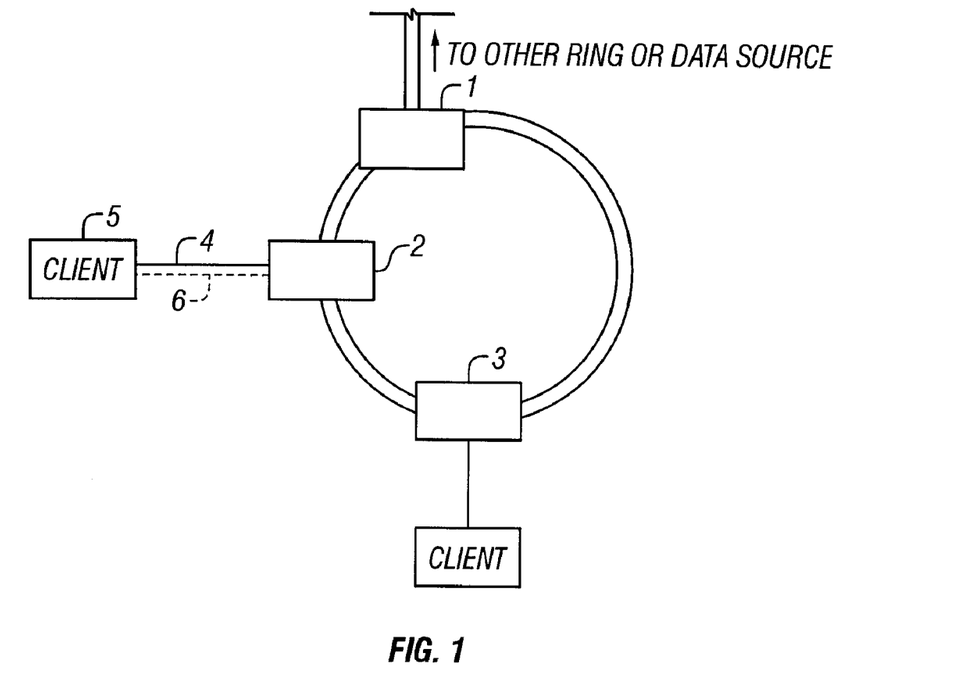
FIG. 1 is a schematic showing a system for use with the present invention.

Referring now to FIG. 1, an optical network for use with the present invention will be described. The network comprises a plurality of nodes or optical network elements represented by boxes 1, 2, and 3. These nodes or optical network elements are connected together by fiber 4 capable of carrying optical communications signals. Preferably, the system is a WDM or DWDM system whereby a plurality of channels are on the same fiber, and the channels may be routed separately according to their wavelength. Each node 1, 2, and 3 may add or drop any number of wavelengths to their client or to other network rings. The ability to quickly and cost effectively sort through the various wavelengths for add, drop, or continue is highly desirable for expanding optical networks. A client 5 may be an IP client sending IP protocols over a control channel 6. A description of a system for use with the present invention can be found in Provisional Patent Application Ser. No. 60/231,056, filed Sep. 25, 2000, incorporated herein by reference.

Figure 2:
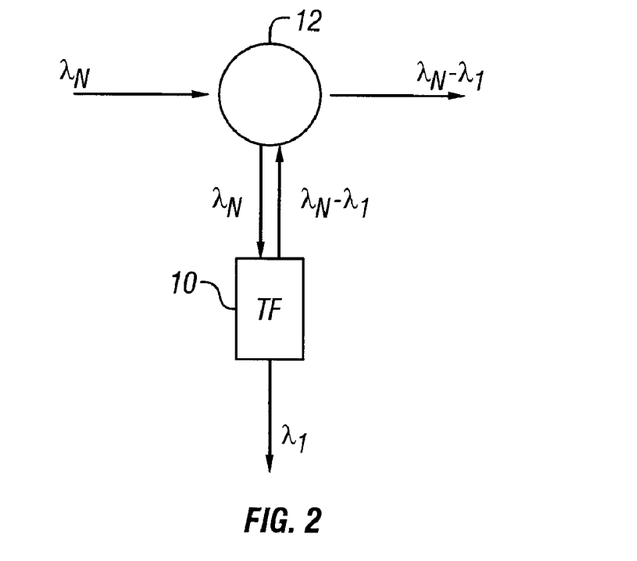
FIG. 2 is a schematic showing wavelength routing of a tunable filter for use with the present invention.

Referring now to FIG. 2, one embodiment of a tunable filter for use with the improved architecture of the present invention will be described. In a preferred embodiment, the tunable filter 10 is one that has a passband that can tuned to pass signal across a wide spectrum of frequencies, possibly as broad as about 1300–1700 nm. Typically, filters such as Fabry-Perot filters for use with the present invention can tune at least across frequencies from about 1528 nm to about 1565 nm. Preferably, filter for use with the present invention may scan through at least about 15 nm, more preferably about 37 nm. Although not limited to this range, this is the spectrum that often contains most of the data and signal carrying wavelengths supported by DWDM systems.

As seen in FIG. 2, tunable filters for use with the present invention will receive light having N signal wavelengths and may drop one signal wavelength λ1 through its passband while reflecting the other signal wavelengths λ(N−1). In some circumstances, the passband may drop a plurality of signal wavelengths. Light have N wavelengths is directed to the tunable filter by a light circulating device such as circulator 12, as indicated from the arrows. The circulator 12 may be a nonreciprocal device having at least an input and an output. In the embodiment shown, the circulator 12 has three ports. Light carrying N−1 wavelengths are returned to the circulator 12 which directs the light onward to the next node or processor (as the case may be). In an exemplary embodiment, the tunable filter is a Fabry-Perot tunable filter as known in the art. The Fabry-Perot filter typically has a resonant chamber that allows wavelengths in the passband to pass while reflecting those frequencies outside the passband. Preferably, the filter will have a normal operating mode where the passband is dropping the desired signal wavelength and a tuning mode where the filter is moving the passband to select a different signal wavelength.

Figure 3:
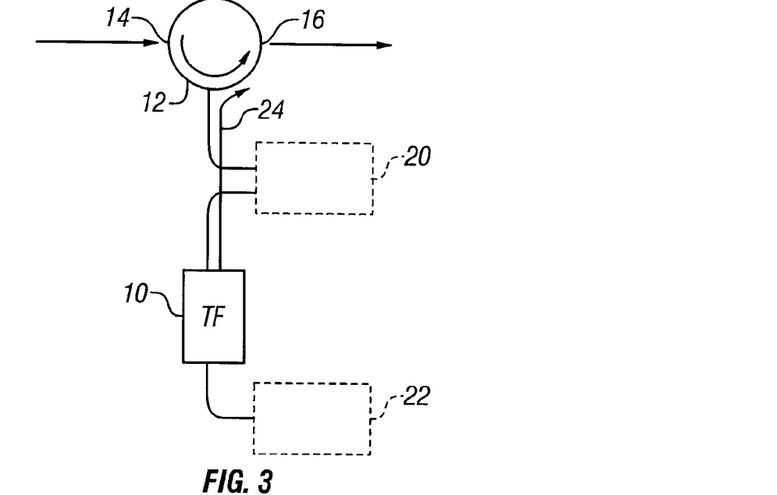
FIG. 3 is generic representation of one embodiment of the present invention.
Figure 4:
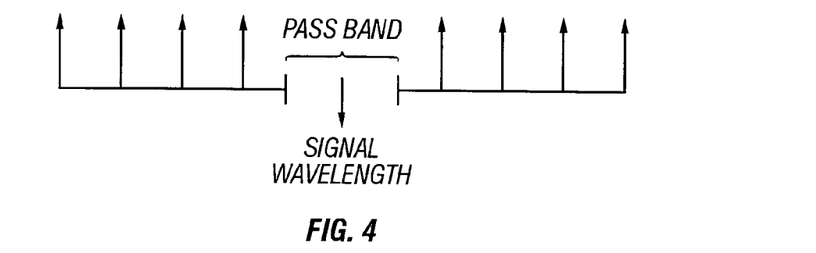
FIG. 4 shows a passband dropping a signal wavelength.

Referring now to FIG. 3A, a generic representation of the present invention will be described. Similar to FIG. 1, a tunable filter 10 receives light traveling from a circulator 12 having input 14 and output 16. It should be understood that other devices may be used in place of circulator 12 so long as they retain the same or similar functionality. When the tunable filter 10 is tuned to drop one signal wavelength for example wavelength 1, other signal wavelengths are reflected or otherwise redirected back to the circulator 12 to continue onward (FIG. 4). When a different wavelength is desired to be dropped at the node, the tunable filter 10 moves its passband to drop the new wavelength, for example wavelength 5. To compensate for the dropping of wavelengths when the passband is traversed to the new wavelength (i.e. the dropping of wavelengths 2, 3, and 4 when the filter scan to reach wavelength 5), the present invention provides mechanisms for preventing the dropping of these wavelengths during tuning. It should be understood that the tunable filter can be used to drop any of the wavelengths in its tunable spectrum and this could be higher than 32 channels or wavelengths. The tunable filter may have a range sufficient to traverse the total channel count. As shown in FIG. 3A, a wavelength routing mechanism 20 or 22 (shown in phantom lines) may be inserted into the system to compensate for the undesired dropping of wavelengths. The routing mechanism 20 is designed to be inserted before the tunable filter 10 while the mechanism 22 is designed to be inserted after the tunable filter 10. The through pathway 24 extends from the tunable filter 10 through and outwardly from the circulator 12.

Figure 5A:
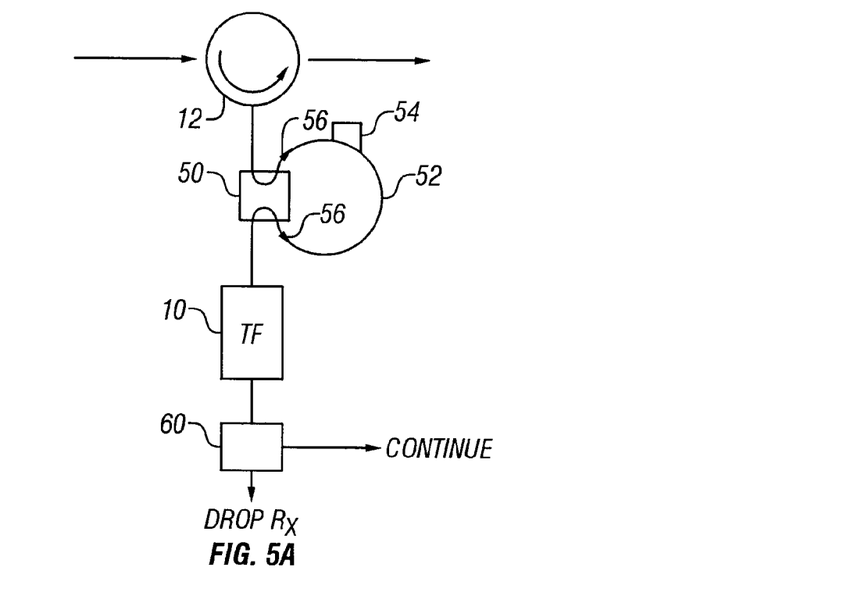
FIGS. 5A–C shows configurations of the present invention using a nonlinear optical loop mirror.
Figure 5B:
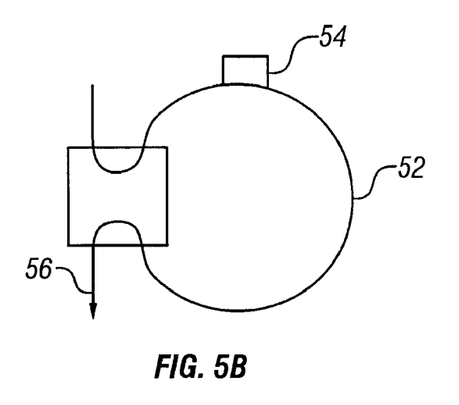
Figure 5C:
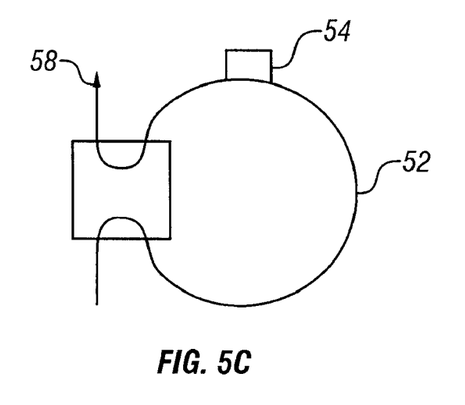

FIG. 5A shows one embodiment of a routing mechanism 20 for use with the present invention. FIG. 5A shows a tunable filter 10 receiving light from the circulator 12. A coupler or light combiner 50 connects a fiber loop that acts as a nonlinear optical loop mirror (NOLM) 52. Although not limited to the following, light combiner or coupler 50 may be a variety of different types of devices such as a conventional directional coupler, a beam splitting cube, or a mirrored beam splitter. The loop mirror 52 has a nonlinear element 54, such as but not limited to a nonlinear element with lithium niobate or other similar devices as known in the art. The NOLM 54 acts similarly to an optical switch, but unlike conventional optical switches, the NOLM in this embodiment can send wavelengths back to the circulator 12 without multi-path issues. In a first or normal operational mode, light passing from the circulator 12 finds it way through the loop 52 and into the tunable filter 10. It does so because, as shown in FIG. 5B, nonlinearity introduced by the element 54 introduces a phase shift which, due to the nature of couplers known in the art, causes light to exit coupler 50 as indicated by arrow 56. Preferably, a phase shift of about is introduced. As seen in FIG. 5A, initially light enters and loops about the loop mirror 52 as indicated by arrows 56. When the nonlinearity of element 54 is removed, light will loop about and only exit back to the circulator as indicated by arrow 58 in FIG. 5C.

In the embodiment of FIG. 5A, when the tunable filter begins scanning for a new wavelength, nonlinearity is removed and thus light including those at the wavelength or wavelengths of the passband are redirected back to the circulator 12. Hence, no wavelengths are dropped while the filter is in tuning mode. In the present embodiment, light passing through the passband of filter 10 is routed to a coupler 60 which provides a drop and continue route. The drop and continue functionality is desirable for situations where information is being "broadcast" and clients at other nodes may require the same data being delivered to the current node. In other embodiments, a switch element (not shown) may be inserted before the coupler 60 to provide a drop-or-continue functionality.

Figure 6:
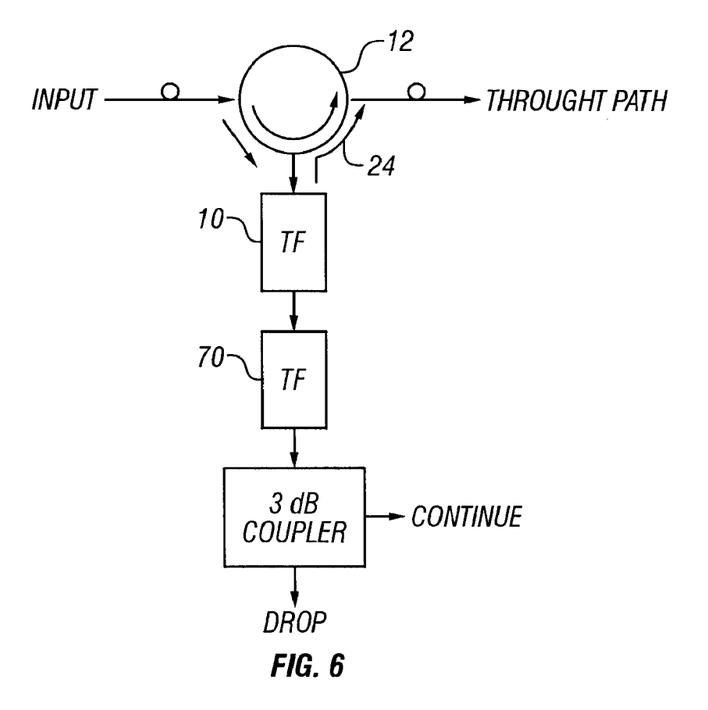
FIG. 6 shows one configuration of the present invention using two tunable filters.

FIG. 6 shows another embodiment of a mechanism 22 for use with the present invention. Mechanism 22 is designed to be positioned downstream from the tunable filter 10. In this embodiment, the mechanism 22 comprises of a second tunable filter 70 which can be tuned to reflect wavelengths dropped during the tuning mode of the first filter 10. Hence the mechanism 22 may act as a wavelength reflector. In normal operational mode, both filters are tuned to pass the same drop-wavelength (or signal wavelength) and to reflect the remaining signal wavelengths. In tuning mode, the second tunable filter 70 receives its tuning command prior to the first tunable filter 10. The lead-time can be set as desired to provide optimal system performance. For example, the lead-time may be set to about 0.8 nm (100 GHz) ahead of the lag filter 10. In this embodiment, as the first tunable filter 10 tunes its passband to the desired drop-wavelength, the wavelengths in between that are undesirably dropped by the filter 10 will be reflected back to the circulator 12 by the second tunable filter 70. So long as the passbands of the two filters are sufficiently staggered (i.e. the light wavelengths passing through the first passband are redirected back to the circulator), the present embodiment will prevent the undesired dropping of signals during tuning. It should be understood that so long as the passbands are sufficiently staggered, in other embodiments the filter 10 may be the lead filter and the second filter 70 may be the lag filter.

Figure 7:
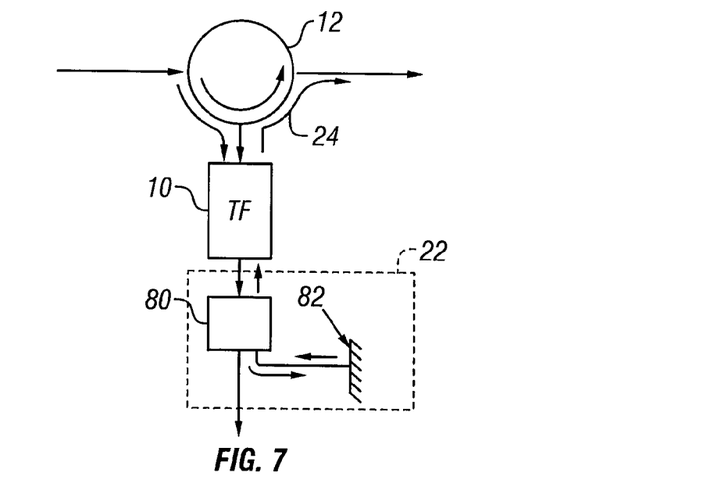
FIG. 7 shows one configuration of the present invention using a mirror.

Referring now to FIG. 7, another embodiment of mechanism 22 will be described. In FIG. 7, the mechanism 22 comprises of a switch 80 optically coupled to a wavelength reflector such as a mirror 82. Preferably, the mirror 82 is a Faraday mirror which reduces the amount of standing waves which may be created by conventional mirrors. The Faraday mirror 82 preferably returns light at a spatial polarization perpendicular to the polarizations within the tunable filter 10. This orthogonal polarization provides a level of protection against any destructive spatial interference that may occur when the light reflected from the mirror 82 is recombined with light in the through path. Preferably, the switch 80 and mirror 82 are positioned at a calculated distance sufficient so that light redirected by the mirror 82 will not be further phase-shifted in the fiber path or otherwise corrupted to destructively combine with light in the through path 24. When the light combiner combines light from the first and second pathways, the polarizations matter to minimize interference. The combining is performed here so that the electric fields from one pathway are always substantially at right angles to those from the other pathway. For example, linear or spatial polarization on one pathway would be on an 'x' axis and that on the other on a 'y' axis. In addition, if one pathway contains right hand circular polarization, then the second path will be arranged to contain left hand circular polarization to more completely avoid optical interferences in the combined light. The pathways may be made of lengths comparable to or shorter than the polarization beat lengths of the fibers used in the pathways. In a first operational mode, switch 80 allows light from the tunable filter 10 to reach the receiver Rx. In a second operational or tuning mode, the switch 80 will direct light from the drop path to the path leading to the mirror 82, thus preventing wavelengths passing though the passband of filter 10 from being undesirably dropped to the receiver Rx during this tuning mode. It should be understood that elements such as the tunable filter, switch and Faraday mirror may be combined into the same packaging to reduce space and provide improved product integration. Other components may be similarly integrated in the same packaging.

Figure 8A:
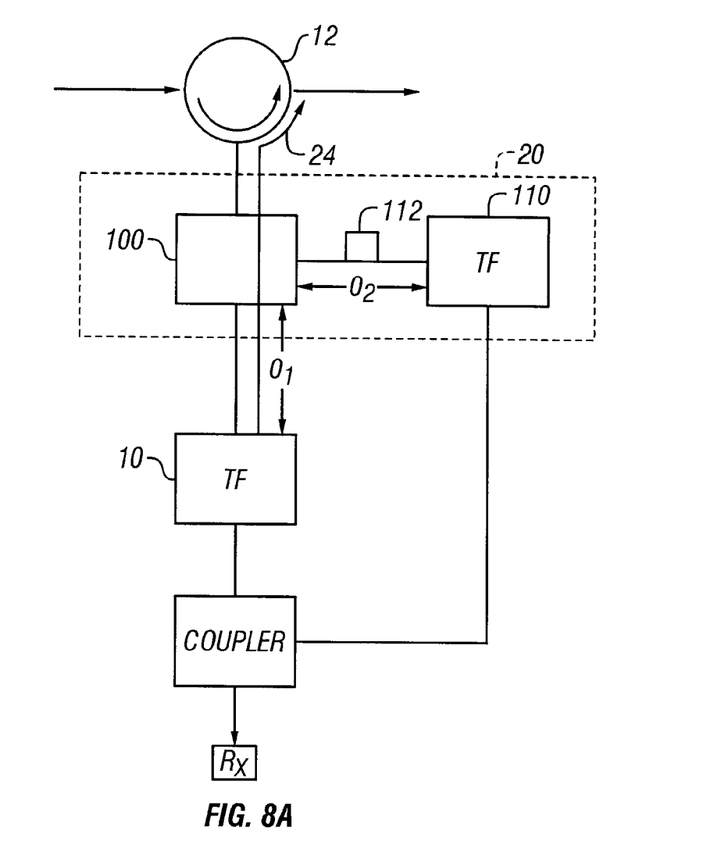
FIGS. 8A–8C show further embodiments according to the present invention.

Referring now to FIG. 8A, another embodiment of the present invention will be described. FIG. 8A shows an embodiment using two tunable filters 10 and 110. In this embodiment, a coupler 100 is preferably used to send signal to two tunable filters 10 and 110. In an exemplary embodiment, the coupler 100 is a polarization splitter/combiner that reduces the likelihood of destructive interference during combining. It should be understood, of course that in place of a polarization splitter/combiner, a coupler may be used and a polarization device 112 interposed in the pathway to introduce polarization. The polarization device may be a variety of devices but is preferably but not limited to a 45° Faraday rotator. Preferably, the coupler is a polarization preserving coupler that does not introduce additional polarization rotation. More preferably, the coupler may be a beam splitting cube or a mirror beam splitter which are known to preserve the polarization of the incoming light.

In the embodiment of FIG. 8A, the coupler 100 preferably sends some portion light to one filter while the other receives the remainder. The light may be split in portions such as, but not limited to, about 50% to one filter while the other receives the other roughly 50%. Both filters 10 and 110 are initially tuned to the same signal wavelength. When it is decide that a new wavelength will be dropped, one filter begins tuning. Although this may cause about 50% of the signal wavelength to be dropped as it scans, about 50% of the signal remains as the filter that is not tuning continues to reflect its 50% portion back to the circulator 12. Preferably, when one filter has completed tuning, the other filter will then do its scanning to read the desired wavelength. Additionally, it is preferred that optical path O1 (double transit from coupler to filter 10) and O2 (from coupler to filters 10 and 110, then returning to the coupler) are substantially equivalent to prevent significant intersymbol interference. In alternative embodiments, the coupler 100 may be replaced with a switch such as an analog switch. A polarization device 112 such as a quarter wave optical retardation plate operating on one of the axes of the circularly polarized light may be inserted before the filter 110. In single pass situations, a half wave retardation plate may be used.

Figure 8B:
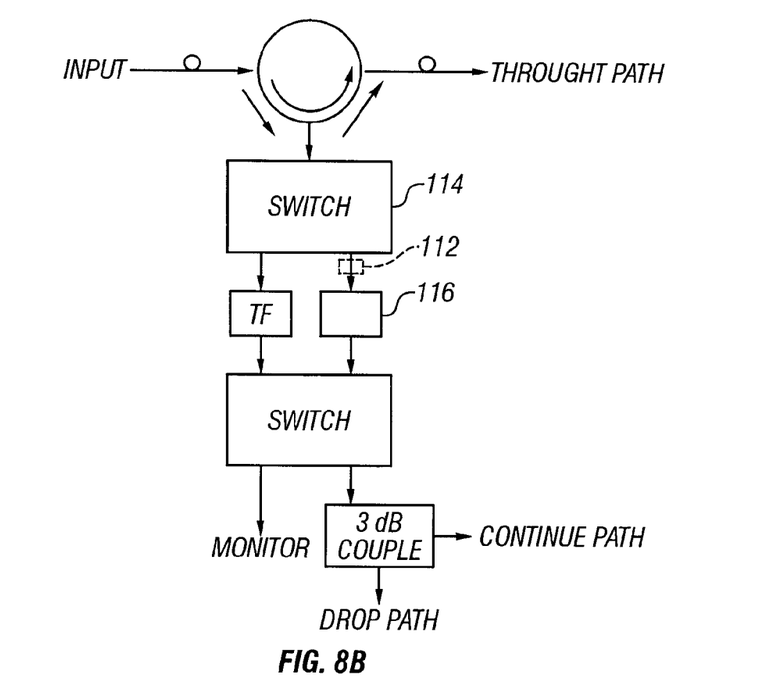

In an alternative embodiment shown in FIG. 8B, an analog switch 114 is used in place of the coupler 100. Hence, one filter can be tuned to the new wavelength and then the switch 114 will transfer light to that filter. There will be a reduction in signal strength during the switch (but at least 50% of light will remain reflected by the other filter). Preferably, a switch is used that allows such transfers without signal loss on the signal wavelengths during the switch event. Again, a polarization rotator 112 may be introduced to change polarization of light. In further alternatives, the reflective element 116, described thus far as a tunable filter, may be a mirrored reflective element or a Faraday mirror.

Figure 8C:
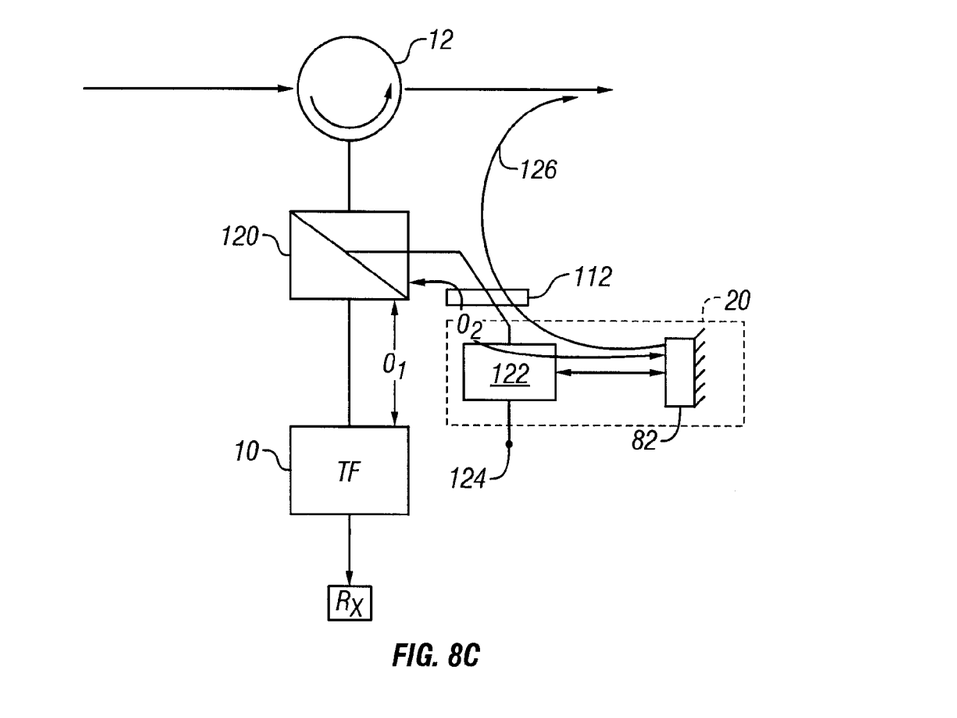

FIG. 8C shows a still further embodiment of the routing mechanism according to the present invention. A coupler 120 is optically coupled to the circulator 12 to split the light coming from the circulator 12. Preferably, the coupler 120 is a polarization preserving coupler that does not introduce additional polarization rotation. More preferably, the coupler may be a beam splitting cube or a mirror beam splitter which are known to preserve the polarization of the incoming light. In one embodiment, the light may be split in portions of about 50% to one filter while the other receives the other roughly 50%. A portion of the light goes to the tunable filter 10 while the remainder goes to switch 122 which is coupled to a Faraday mirror 82. Other embodiments may use different types of mirrors. A polarization device 112 (shown in phantom) may again be included to introduced an appropriate amount of circular or temporal polarization on one axes of the circularly polarized light. When not in use, the switch 122 has a first operational mode that directs light to a terminator 124. When the tunable filter 10 is about to start tuning, the switch 122 in second operational mode will direct light to mirror 82, which in turn reflects light back up to the circulator as shown by arrow 126. Hence, while the filter 10 is tuning, the mirror 82 will reflect light including those at frequencies that would be dropped by the passband back to the circulator 12 with a 3 db loss. Preferably, the path lengths O1 and O2 of the light coming from mirror 82 and those reflecting back from tunable filter 12, respectively, will be of about the same length so as to minimize any intersymbol interference when the light combines at coupler 120. Time delay units may be introduced on either path to minimize interference or equalize paths. In a further alternative embodiment, the switch 122 may be removed and the coupler 120 replaced with an ultrahigh speed switch such as an electro-optic or other type switch with a fast switching time. Preferably, the switch would be of speed sufficient to eliminate or significantly reduce data loss during the switching period.

Figure 9A:
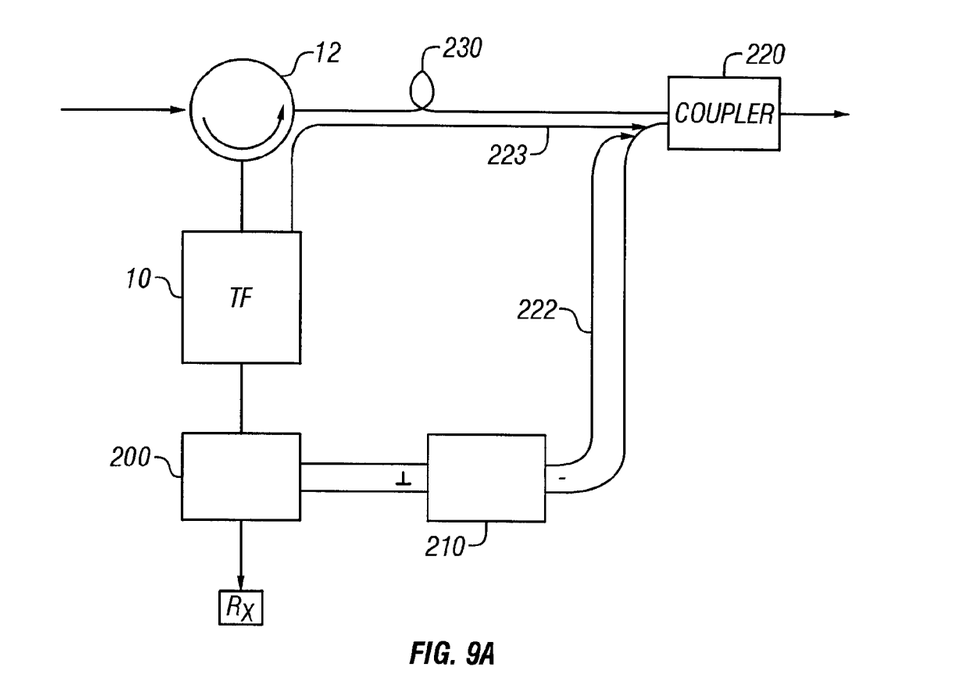
FIGS. 9A–9B are schematics showing still further embodiments according to the present invention.

Referring now to FIG. 9A, a still further embodiment of the present invention will be described. FIG. 9A shows a tunable filter 10 receiving light from circulator 12. A switch 200 is located downstream from the tunable filter 10 for redirecting light passing through the passband when the filter is in tuning mode. Preferably, a polarization device 210 such as, but not limited to a Faraday rotator or Faraday isolator, is included to adjust the polarization of light coming from the switch 200. The polarization device 210 may also be an appropriate optical retardation plate. The polarization is used to prevent multiple path interference when light is recombined at coupler 220. Again, the coupler is preferably a polarization preserving coupler that does not introduce additional polarization rotation. More preferably, the coupler may be a beam splitting cube or a mirror beam splitter which are known to preserve the polarization of the incoming light.

Figure 9B:
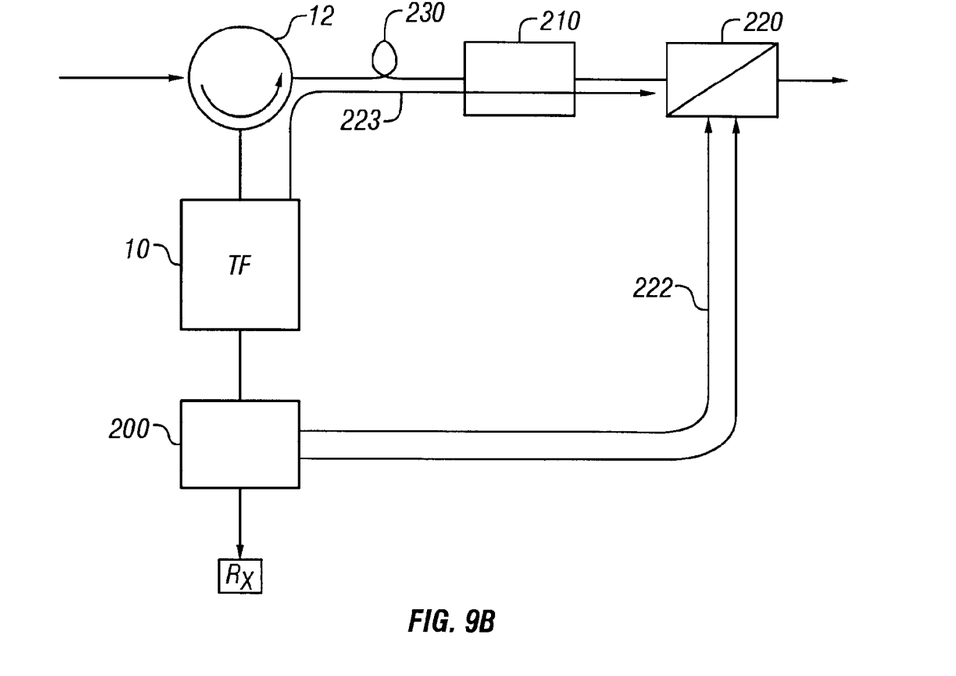

In an exemplary embodiment of FIG. 9A, a time delay mechanism 230 may be a fiber loop of sufficient length to prevent intersymbol interference by the light being recombined at coupler 220 by equalizing the path distance traveled. The mechanism 230 may be other time delay mechanisms such as free-space time delay elements. Again, when the tunable filter 10 is in tuning mode, the switch 200 will redirect light passing through the passband to coupler 220 along a path as indicated by arrow 222. A through path or pathway is illustrated by arrow 223. In one embodiment, these paths do not overlap until the light from the paths recombine at the coupler 220. The paths may be measured from the point where light in the filter is separated such as the point where the filter separates the desired signal wavelength from the others, which are then reflected back. It could also be viewed as the point where the desired signal wavelength travels a path distinct and separate from the path of those signal wavelengths that were not selected. When the filter IO has positioned the passband to drop a new signal wavelength, the switch 200 will allow light to exit to the drop pathway to the receiver Rx. As seen in FIG. 9B, the position of polarization device 210 may be moved from a path downstream to the switch 200 to an alternate path downstream from circulator 12. It should be understood that the device 210 may also be positioned before or after the mechanism 230. If the paths of FIGS. 9A and 9b are shorter, or approximately one beat length long, then little signal sag should occur in tuning.

Figures 9C, 10:
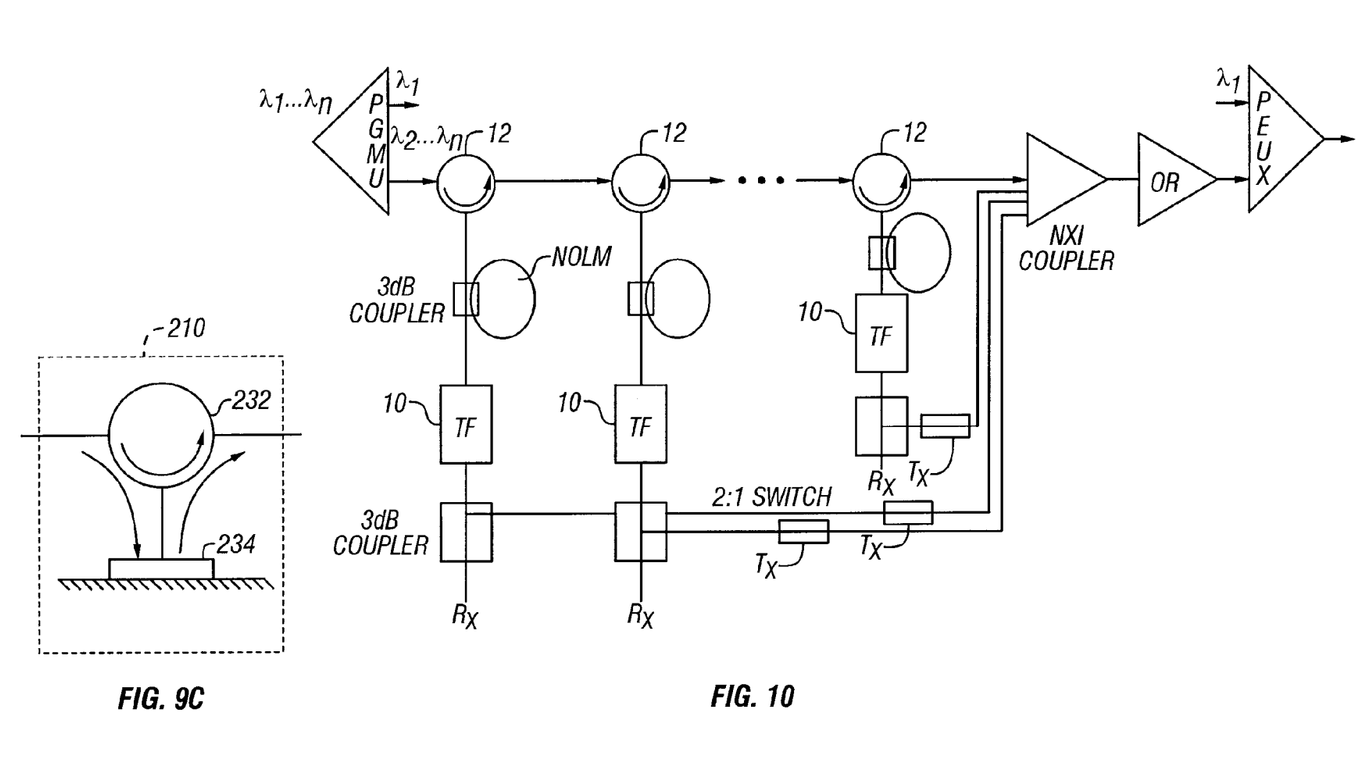
FIG. 9C is a schematic showing one embodiment of a polarization device for use with the present invention.
FIG. 10 shows a node architecture using a series of cascaded light circulating devices.

Referring now to FIG. 9C, it should be understood that the polarization device 210 may comprise a circulator 232 and a faraday mirror 234. In some embodiments, the use of this circulator is not necessary. For example, where switch 200 is a mirrored switch or one activated with mirroring action, light on the through path in FIG. 9A will encounter an odd number of mirrors reflections or "flips" (one at the tunable filter) and light on the second path will encounter an even number of flips (switch 200 and beam splitting cube 220), or vice versa. Such an arrangement of mirror reflection will minimize the chance of interference as light is recombined at coupler 220. If a non-mirrored switch is used, then the circulator 232 and faraday mirror 234 combination may be used to ensure that the number of flips or mirror reflections are even on one path and odd on the other. Although a Faraday mirror is preferred, a non-Faraday mirror may be used in combination with circulator 232.

Referring now to FIG. 10, it should be understood that each circulator 12 and tunable filter 10 combination may be cascaded to select a plurality of signal wavelengths for add/drop or add/drop/continue. FIG. 10 shows embodiments using NOLM for routing of dropped signal wavelengths, but other mechanisms using mirrors or other assemblies as discussed in the present invention may also be used as appropriate.

Figure 11:
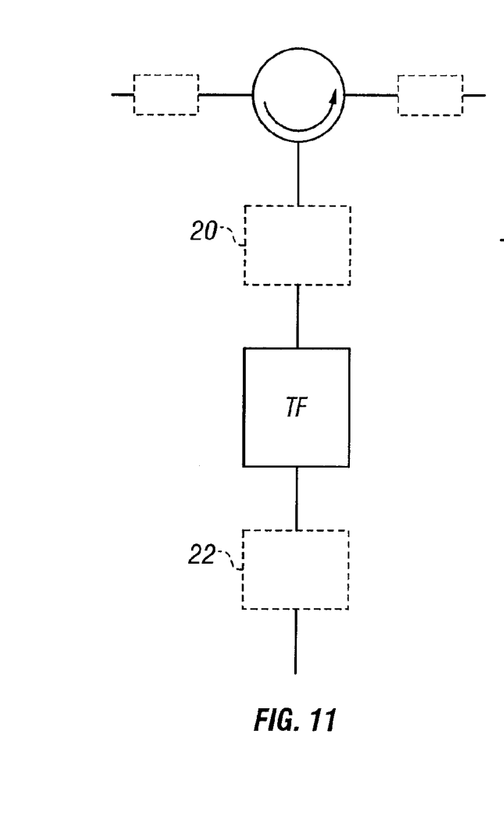
FIG. 11 is schematic showing possible locations of wavelength routing mechanisms according to the present invention.

Referring now to FIG. 11, a schematic is shown generically illustrating with phantom boxes where various wavelength routing or reflecting devices may be located in different embodiments of the present invention. The phantom boxes may contain Faraday mirrors, polarization rotators, NOLM, or other devices as described above for remedying the issue of dropped wavelengths during tuning.

Figure 12A:
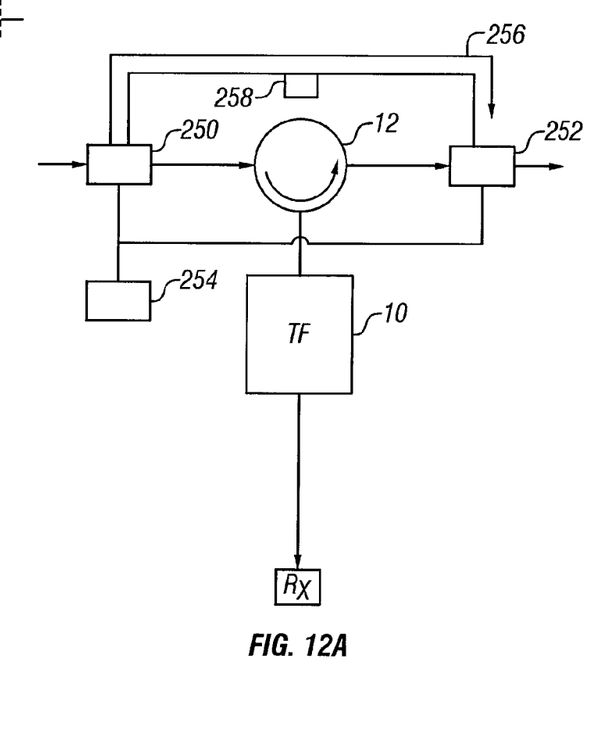
FIGS. 12A–12B shows an alternative embodiment of the present invention using at least one switch.

FIG. 12A shows one embodiment of an assembly having a first switch 250 with a low insertion loss and placed upstream from circulator 12. A second switch 252 is placed downstream from the circulator 12 and optically coupled to the first switch 250. A control unit 254 may be used to coordinate the timing of switches 250 and 252. The switches may be digital switches of sufficient speed to minimize data loss or they may be analog switches that allow for a gradual change over during switching. Prior to tuning of the filter 10, switch 250 will route light along a path as indicated by arrow 256 to switch 252. The switch 252 will be coordinated with switch 250 so as to be coordinated during the switching process. In alternative embodiments, the switch 252 may be replaced with a coupler to simplify the coordinating step. Routing light along path 256 allows the filter 10 to tune its passband without dropping any signal wavelengths. A time delay element 258 may be placed along path 256 to simplify coordination of switching.

Figure 12B:
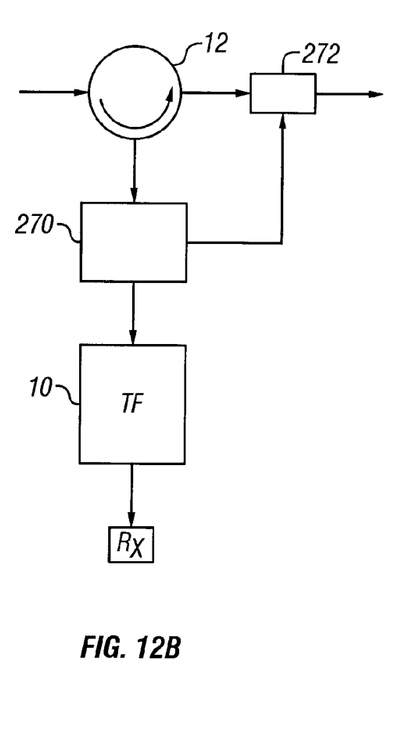

FIG. 12B shows a still further embodiment of an assembly according the present invention. The assembly includes a switch 270 optically coupled to receive light from the circulator 12. The switch 270 in one operational mode directs light to the tunable filter 10. The switch 270 may be an analog switch or a very high speed digital switch. In a second operational mode, the switch 270 directs light to coupler 272. In some alternatives, the coupler 272 may be a switch as well. The second operational mode directs light away from the tunable filter 10 while the filter tunes its passband to select a new signal wavelength.

Figure 13:
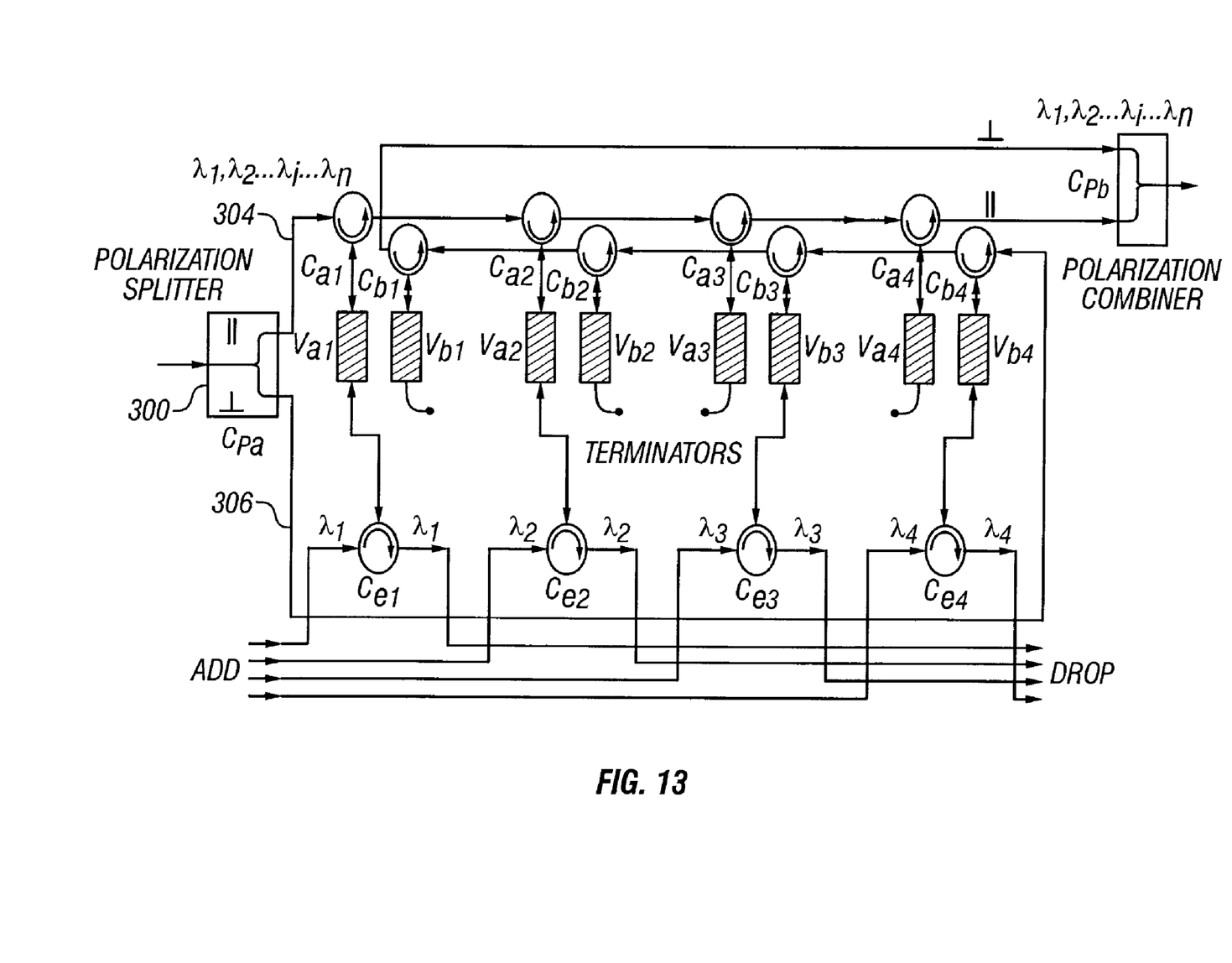
FIGS. 13–14 show still further embodiments of the present invention using a plurality of tunable filters.

Referring now to FIG. 13, another embodiment of the present invention will now be described. In this embodiment showing node architecture between optical amplifiers, an optical polarization splitter 300 is used to separate the input light from the network to two bundles or portions of orthogonally polarized light. Each polarized light bundle goes through a series of cascaded circulators. Each tunable filter unit in parallel polarized light path works with reversibly numbered tunable filter unit in the perpendicular light path. One set of the tunable filters are coupled to add/drop light circulating devices C1–C4. Hence, in the embodiment of FIG. 13, only the first two tunable filters on each path are used for add/drop or add/drop/continue since the signal strengths are strongest. The latter two on each transmission path 304 and 306 are used to reflect light at wavelengths that might be dropped by the corresponding tunable filter on the other path. Since the filters may be bidirectional, the filter also provides a protection function to insure that wavelengths being added are within that of the passband and not at a wavelength that may conflict with other wavelengths. When a signal wavelength is dropped, the corresponding tunable filter (dropping to a terminator) also drops that signal wavelength so as to prevent wavelength continuation and open the wavelength "slot" for add function. The orthogonal light bundles are recombined at polarization combiner 302 and sent downstream to the next node or cascade of tunable filter assemblies.

Figure 14:
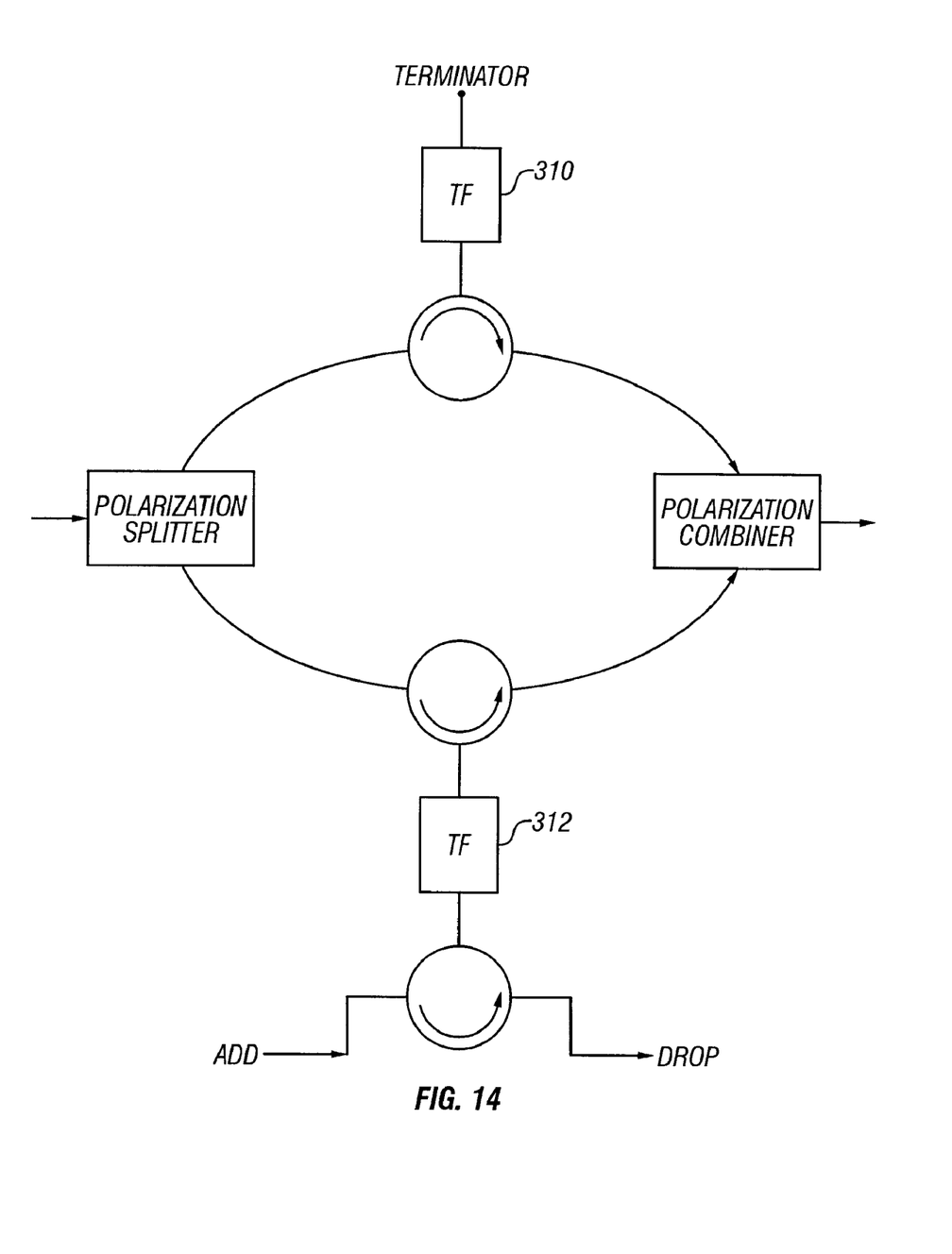

FIG. 14 shows a simplified version of the configuration of FIG. 13 for ease of illustration. The corresponding tunable filter 310 on the perpendicular light path is used to reflect light at wavelengths that may be accidentally dropped by the tunable filter 312 during tuning of the passband. When a wavelength is added at tunable filter 312, the tunable filter 310 drops the appropriate wavelength on the other light pathway to prevent conflicts when the signals are combined. The light combiner may be a conventional or a polarization light combiner. The light splitter may also be a convention or a polarization light splitter (if the combiner is a polarization combiner and vice versa).

While particular embodiments of the invention have been herein described in detail, it is to be appreciated that the present invention encompasses variations and combinations thereof, as may be apparent to one of ordinary skill from this disclosure. For example, the present invention may be used at other grid spacings besides those for International Telecom Union (ITU) grid DWDM. It should be understood that the present invention may also be used in other multichannel configurations and is not limited to systems using ITU grid DWDM wavelength spacings. The system may use L-band or other frequencies instead of C-band frequencies associated with typical DWDM systems. Circulators used with the present invention may have more than three ports. Conventional couplers used in the present invention may be replaced with polarization preserving couplers such as a beam splitting cube or a mirror beam splitter that are known to preserve the polarization of the incoming light. Other couplers with different split percentage ratios (60:40, 90:10, etc...) may also be used in place of conventional couplers. The term optically coupled as used herein may mean that light may travel through other components prior to reaching two components which are optically coupled. It should be understood that wavelength routing mechanisms shown in an upstream position may also be placed downstream from the tunable filter. The present invention is not limited for use with Fabry-Perot filters and any optical filter with this problem of dropping wavelengths through its passband may be addressed by the present invention. It is therefore to be understood that within the scope of the appended claims, the invention may be practiced otherwise than as specifically described herein.

What is claimed is:

1. An optical assembly for use with a receiver and preventing undesired leakage of light containing signal wavelengths, the assembly comprising:

a light circulating device;

a tunable filter;

a wavelength routing mechanism receiving light from the tunable filter;

a coupler for joining light from a first path with light from a second path to return a dropped signal wavelength;

an arrangement of mirror reflections on said first path and said second path so that an even number of mirror reflection are experienced on one path and an odd number on the other path as light is recombined at the coupler;

said mechanism having an operational mode directing light passing through the tunable filter along said second path and preventing light from reaching said receiver.

2. An optical assembly as in claim 1 where said coupler comprises a beam splitting cube.

3. An optical assembly as in claim 1, wherein said wavelength routing mechanism comprises a switch optically coupled downstream to said tunable filter.

4. An optical assembly as in claim 3, wherein said switch comprises a switch operated by optical mirroring action.

5. An optical assembly for directing light and for use with a receiver, the assembly comprising:

a light circulating device having at least an input and an output;

a tunable filter receiving light traveling from the light circulating device;

a wavelength routing mechanism optically coupled to the tunable filter, said mechanism having an operational mode preventing light from reaching said receiver by directing wavelengths passing through the tunable filter along a path extending outwardly from said wavelength routing mechanism towards a light combiner for joining light on the first path with light on a second path extending outwardly from the output of the light circulating device; and a polarization rotating device disposed along said first pathway for changing polarization of light on said first pathway prior to joining light from said second pathway at said coupler.

6. An optical assembly as in claim 5 further comprising:

a polarization rotating device performing spatial polarization rotation.

7. An optical assembly as in claim 5 further comprising:

a polarization rotating device performing temporal polarization rotation.

8. An optical assembly as in claim 5 further comprising:

a polarization rotating device comprising an optical retardation plate for performing temporal polarization rotation.

9. An optical assembly as in claim 5 further comprising:

a polarization rotating device performing temporal polarization rotation by means of an arrangement of mirror reflections, with an even number in one pathway and an odd number in the other pathway.

10. An optical assembly as in claim 5 further comprising:

An odd number of mirror reflections in one pathway and zero or an even number of optical mirror reflections on the other pathway.

11. An optical assembly as in claim 5 wherein said wavelength directing mechanism comprises an optical switch.

12. An optical assembly as in claim 11 wherein said optical switch comprises an optical switch which internally uses a mirror action.

13. An optical assembly as in claim 5 wherein said coupler comprises a 3 db coupler.

14. An optical assembly as in claim 5 wherein said polarization rotating device comprises a Faraday rotator.

15. An optical assembly as in claim 5 wherein said polarization rotating device comprises a Faraday mirror and an associated circulator.

16. An optical assembly as in claim 5 further comprising a second pathway changing both spatial and temporal polarization.

17. An optical assembly as in claim 5 further comprising spatial polarization by means of a Faraday rotator and temporal polarization by an arrangement of mirror actions.

18. An optical assembly as in claim 5 further comprising an optical retardation plate for temporal polarization.

* * * * *